(12) United States Patent
Imoto et al.

(10) Patent No.: US 10,392,533 B2
(45) Date of Patent: *Aug. 27, 2019

(54) ADHESIVE SHEET

(71) Applicant: NITTO DENKO CORPORATION, Ibaraki-shi, Osaka (JP)

(72) Inventors: Eiichi Imoto, Osaka (JP); Yoshio Nakagawa, Osaka (JP); Kenichi Nishikawa, Osaka (JP); Yasunori Yamamoto, Osaka (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/909,846

(22) PCT Filed: Jun. 23, 2014

(86) PCT No.: PCT/JP2014/066571
§ 371 (c)(1),
(2) Date: Feb. 3, 2016

(87) PCT Pub. No.: WO2015/019726
PCT Pub. Date: Feb. 12, 2015

(65) Prior Publication Data
US 2016/0168425 A1 Jun. 16, 2016

(30) Foreign Application Priority Data
Aug. 5, 2013 (JP) .................................. 2013-161981

(51) Int. Cl.
| C09J 7/02 | (2006.01) |
| C09J 7/25 | (2018.01) |
| C08G 18/50 | (2006.01) |
| C08G 18/62 | (2006.01) |
| C09J 175/04 | (2006.01) |
| C09J 133/08 | (2006.01) |

(52) U.S. Cl.
CPC ............ *C09J 7/25* (2018.01); *C08G 18/5015* (2013.01); *C08G 18/622* (2013.01); *C09J 175/04* (2013.01); *C09J 133/08* (2013.01); *C09J 2201/622* (2013.01); *C09J 2203/306* (2013.01); *C09J 2205/114* (2013.01); *C09J 2433/00* (2013.01); *C09J 2475/006* (2013.01)

(58) Field of Classification Search
None
See application file for complete search history.

(56) References Cited

U.S. PATENT DOCUMENTS

| 3,894,169 A * | 7/1975 | Miller .................... E04B 1/82 181/207 |
| 5,468,532 A * | 11/1995 | Ho ........................... B44C 1/17 428/40.9 |
| 5,965,256 A * | 10/1999 | Barrera .................. B05D 5/083 427/407.1 |
| 2003/0026932 A1* | 2/2003 | Johnson .................. B32B 15/08 428/40.1 |
| 2004/0229066 A1 | 11/2004 | Ikishima et al. |
| 2005/0142362 A1* | 6/2005 | Inaoka ...................... C08J 3/28 428/411.1 |
| 2005/0186415 A1* | 8/2005 | McCormick ...... B32B 17/10009 428/336 |
| 2006/0177654 A1* | 8/2006 | Shoshi ................... C09J 7/0296 428/354 |
| 2006/0188725 A1* | 8/2006 | Yoshida .................. B32B 27/40 428/411.1 |
| 2007/0077420 A1* | 4/2007 | Worthen ............ C08G 18/4854 428/354 |
| 2008/0199704 A1* | 8/2008 | Ho .......................... B32B 7/12 428/412 |
| 2009/0009577 A1* | 1/2009 | Nigam .................. B41M 5/502 347/105 |
| 2011/0064900 A1* | 3/2011 | Uesugi .................. C09J 7/0264 428/41.3 |
| 2011/0064946 A1 | 3/2011 | Kai et al. |
| 2011/0117364 A1 | 5/2011 | Uesugi et al. |

(Continued)

FOREIGN PATENT DOCUMENTS

| CN | 102101986 A | 6/2011 |
| JP | 59-041376 A | 3/1984 |

(Continued)

OTHER PUBLICATIONS

Mir Mohammad Alavi Nikje, "Recycling of Polyurethane Wastes", 2016, Smithers Rapra Technology Ltd, p. 5.*
International Search Report for PCT/JP2014/066571 dated Sep. 16, 2014 [PCT/ISA/210].
Extended European Search Report dated Mar. 14, 2017, from the European Patent Office in counterpart European application No. 14834270.2.
Notification of Reasons for Rejection dated Feb. 9, 2018, from the Japanese Patent Office in counterpart application No. 2014-128122.
Notification of First Office Action dated Feb. 7, 2018 from the State Intellectual Property Office of the P.R.C. in counterpart application No. 201480044102.1.

(Continued)

*Primary Examiner* — Anish P Desai
(74) *Attorney, Agent, or Firm* — Sughrue Mion, PLLC (57) ABSTRACT

[Problem] To provide an adhesive sheet having a surface sliding property and stainproof property.
[Means for solving] An adhesive sheet is one that comprises at least a substrate and an adhesive layer, a static friction coefficient of the substrate is 0.05 or more and 1.50 or less, and an absolute value of a ΔL* value of the substrate is 0.01 or more and 45.00 or less. A load at a time of 5% elongation of the substrate is preferably 1 N/cm or more and 15 N/cm or less. And a stress relaxation rate of the substrate by elongating to 10%, stopping the elongation at that state and after lapsing 600 seconds is preferably 40% or more and 100% or less.

9 Claims, 1 Drawing Sheet

(56) References Cited

U.S. PATENT DOCUMENTS

| | | | |
|---|---|---|---|
| 2011/0171477 A1* | 7/2011 | Kai | C08F 220/36 428/424.4 |
| 2012/0028040 A1 | 2/2012 | Kai et al. | |
| 2012/0070659 A1 | 3/2012 | Nakagawa et al. | |
| 2015/0184038 A1* | 7/2015 | Schaner | C09J 7/0296 428/41.8 |
| 2016/0272851 A1* | 9/2016 | Imoto | C09J 7/0282 |

FOREIGN PATENT DOCUMENTS

| JP | 2004-291308 A | 10/2004 |
|---|---|---|
| JP | 2007-070401 A | 3/2007 |
| JP | 2008-539107 A | 11/2008 |
| JP | 2011-105858 A | 6/2011 |
| JP | 2012-62454 A | 3/2012 |
| JP | 2012-224683 A | 11/2012 |
| JP | 2014-145034 A | 8/2014 |
| WO | 2009051059 A1 | 4/2009 |
| WO | 2009/139446 A1 | 11/2009 |
| WO | 2014/119426 A1 | 8/2014 |

OTHER PUBLICATIONS

Notification of Second office Action dated Sep. 29, 2018, from the State Intellectual Property Office of People's Republic of China in counterpart Application No. 201480044102.1.

Communication dated Nov. 22, 2018 from the European Patent Office in application No. 14834270.2.

Decision of Rejection dated Apr. 8, 2019, issued by the China National Intellectual Property Administration in counterpart application No. 201480044102.1.

\* cited by examiner

ADHESIVE SHEET

CROSS REFERENCE TO RELATED APPLICATIONS

This application is a National Stage of International Application No. PCT/JP2014/066571 filed Jun. 23, 2014, claiming priority based on Japanese Patent Application No. 2013461981 filed Aug. 5, 2013, the contents of all of which are incorporated herein by reference in their entirety.

TECHNICAL FIELD

The present invention relates to an adhesive sheet, and in particular to an adhesive sheet for protection having a surface sliding property and stainproof property.

BACKGROUND ART

In the automobile and aircraft industries, for example, an adhesive sheet is sometimes adhered to the coating surface of a body of an automobile, etc., for preventing from damage or for marking, etc. This adhesive sheet is directly adhered onto the coating surface by manual operation using a squeegee, etc., but the squeegee does not slide at the surface of the adhesive sheet so that there are problems that wrinkles and flaws are generated at the adhesive sheet, etc.

Also, to the adhesive sheet adhered for the purpose of protecting the surface, etc., is attached stain, attached rain water containing stain, or attached washing water used for removing dirt, so that stainproof property at the surface is required.

PRIOR ART TECHNICAL DOCUMENT

Patent Document

Patent Document 1: JP Sho. 59-41376A

SUMMARY OF THE INVENTION

Problems to be Solved by the Invention

The present invention has been accomplished to solve the above-mentioned problems, and an object of the present invention is to provide an adhesive sheet having a surface sliding property and excellent stainproof property.

Means to Solve the Problems

The adhesive sheet of the present invention is an adhesive sheet comprising at least a substrate and an adhesive layer, a static friction coefficient of the substrate being 0.05 or more and 1.50 or less, and an absolute value of a ΔL* value of the substrate being 0.01 or more and 45.00 or less.

Here, a load at the time of 5% elongation of the substrate is preferably 1 N/cm or more and 15 N/cm or less.

It is also preferred that a stress relaxation rate of the substrate by elongating to 10%, stopping the elongation at that state and after lapsing 600 seconds is 40% or more and 100% or less.

In the present invention, it is preferred that the substrate has a surface protective layer and a substrate layer, and the surface protective layer is provided at the outermost surface of the adhesive sheet.

In the present invention, a gloss value of the substrate at a measurement angle of 20° is preferably 70 or more.

In the present invention, it is preferred that the substrate layer contains at least a urethane-based polymer.

Here, the urethane-based polymer constituting the substrate layer is preferably an ester-based thermoplastic polyurethane or an ether-based thermoplastic polyurethane.

In the present invention, a Shore hardness of the substrate layer is preferably 80A or more and 65D or less.

In the present invention, the surface protective layer preferably comprises an acrylic-based resin, a fluorine-based resin or a urethane-based polymer as a main component(s).

In the present invention, the acrylic-based resin preferably contains a (meth)acrylic-based polymer having a hydroxyl value of 20 to 120 (KOH mg/g).

The above-mentioned any of the adhesive sheets is preferably used as a protective sheet for protecting the surface of an adherend.

Effects of the Invention

According to the present invention, an adhesive sheet having a good surface sliding property and having excellent stainproof property could be realized. Also, according to the present invention, an adhesive sheet further having curved surface followability, well-following to a portion having a three-dimensionally curved surface, neatly adhering without repelling or floating after the adhesion could be realized.

EMBODIMENTS TO CARRY OUT THE INVENTION

In the following, the present invention will be explained in detail.

The adhesive sheet of the present invention is an adhesive sheet having a substrate and an adhesive layer, and a static friction coefficient of the substrate is required to be 0.05 or more and 1.50 or less, preferably 0.05 or more and 1.00 or less, particularly preferably 0.05 or more and 0.5 or less. If the static friction coefficient is less than 0.05 or larger than 1.50, good surface sliding property cannot be realized. Incidentally, the measurement method of the static friction coefficient is specifically explained in Examples.

In addition, an absolute value of a ΔL* value (at an angle of 20°) of the substrate is required to be 0.01 or more and 45.0 or less, preferably 0.01 or more and 30.00 or less, more preferably 0.01 or more and 15.00 or less, and particularly preferably 0.01 or more and 8.00 or less.

In the present invention, the ΔL* value is employed as an index of the stainproof property. Provided that measurement of the ΔL* value is carried out as follows. That is, after adhering the substrate to an acrylic baked white coating plate, an initial L* value (an average value at light receiving angles of 15°, 25°, 45°, 75° and 110°) is measured by using a multi-angle spectral colorimeter. Incidentally, an acrylic adhesive layer with a thickness of 50 μm is formed onto one of the surfaces of the substrate to prepare an adhesive sheet, and the adhesive sheet may be adhered to an acrylic baked white panel using a roller.

Thereafter, with regard to the substrate (ex., the adhesive sheet) which had been subjected to the procedure in which a contaminated water (JIS Z-8901-84) is coated on the substrate (ex., the adhesive sheet) and then dried is carried out 8 cycles, and the contaminated water-coating film is washed while washing with water, an L* value (an average value at light receiving angles of 15°, 25°, 45°, 75° and) 110° after the test is measured by using a multi-angle spectral colorimeter. These numerical values are incorporated into the following formula to calculate the ΔL* value.

ΔL*value=L*value after the test−initial L*value

The adhesive sheet of the present invention is preferably a load of the substrate at the time of 5% elongation of 15 N/cm or less, and a lower limit value is preferably 1 N/cm or more, further preferably 1 N/cm or more and 12 N/cm or less, and particularly preferably 1 N/cm or more and 10 N/cm or less. Provided that the load of the substrate at the time of 5% elongation is a value measured at the state in which an acrylic adhesive layer with a thickness of 50 μm is provided onto the substrate, as specifically explained in Examples. By existing the load of the substrate at the time of 5% elongation within the specific range, an adhesive sheet excellent in curved surface followability to the portion having a three-dimensionally curved surface can be easily realized.

Further, it is preferred that the substrate satisfies the specific stress relaxation property. That is, a stress relaxation rate in which after subjecting to 10% elongation, the substrate is allowed to stand for 600 sec at the state of stopping the elongation is preferably 40% or more and 100% or less, more preferably 60% or more and 100% or less. Provided that the stress relaxation rate of the substrate is a value measured at the state in which an acrylic adhesive layer with a thickness of 50 μm is provided onto the substrate, as specifically explained in Examples.

In the present invention, the substrate may be a single layer sheet comprising a substrate layer alone, but preferably a laminated sheet comprising a substrate layer and a surface protective layer. Provided that the surface protective layer is provided at an uppermost surface of the adhesive sheet. Also, when the adhesive sheet of the present invention is required to have weather resistance, the substrate preferably comprises a non-yellowing resin, and when it comprises a laminated sheet structure, each of the surface protective layer and the substrate layer preferably comprises a non-yellowing resin.

In the present invention, for example, when the substrate is a material which satisfies the load at the time of 5% elongation of 1 to 15 N/cm and the stress relaxation rate of 40 to 100%, the materials) of the substrate layer is/are not specifically limited, and the substrate layer preferably contains at least a urethane-based polymer as an effective ingredient.

Such a urethane-based polymer is preferably an ester-based thermoplastic polyurethane or an ether-based thermoplastic polyurethane, and an ester-based thermoplastic polyurethane is more preferred. Incidentally, when fuel-oil resistance is further considered, the material(s) of the substrate layer particularly preferably contains an ester-based thermoplastic polyurethane as an effective ingredient.

The ester-based thermoplastic polyurethane to be preferably used in the present invention may be mentioned, for example, an adipate-ester-based thermoplastic polyurethane, a polycaprolactone-ester-based thermoplastic polyurethane, etc.

In the present invention, the substrate layer preferably has a Shore hardness PIS K6253: 2006) of 80A or more and 65D or less, further preferably 85A or more and 97A or less.

Also, a thickness of the substrate layer may be optionally selected depending on the purpose, etc., preferably 50 μm or more, and particularly preferably 100 μm or more. In addition, the upper value of the thickness is preferably about 1 mm or so. The thickness of the substrate layer is, for example, in the case of the chipping use to be used for protecting the body of an automobile, preferably about 50 to 800 μm or so, more preferably about 100 to 600 μm or so. Further, in the case of the use for an aircraft, it is about 50 to 1,000 μm or so, more preferably about 200 to 800 μm or so. Moreover, in the case of the use for a motorcycle, it is preferably about 50 to 800 μm or so, more preferably about 100 to 600 μm or so.

In the present invention, it is preferred that the Shore hardness and the thickness of the substrate layer are optionally determined so that the substrate satisfies the numerical ranges of the above-described SS physical properties.

The substrate layer constituting the substrate of the present invention can be a composite film, containing a (meth)acrylic-based polymer and a urethane polymer.

A weight ratio of the (meth)acrylic-based polymer and the urethane polymer in the composite film is preferably within the range of (meth)acrylic-based polymer/urethane polymer=1/99 to 80/20. If the contained ratio of the (meth)acrylic-based polymer is less than 1/99, a viscosity of the precursor mixture is high and workability is worsened in some cases, while if it exceeds 80/20, flexibility or strength as the film cannot be obtained in some cases.

The (meth)acrylic-based polymer constituting the composite film preferably comprises a material formed by using an acrylic component including at least a (meth)acrylic acid-based monomer and a monofunctional (meth)acrylic-based monomer, in particular, it is preferred to use a monofunctional (meth)acrylic-based monomer in which a glass transition temperature (Tg) of the homopolymer is 0° C. or higher. Further, in the present invention, the (meth)acrylic-based polymer preferably comprises a material formed by using an acrylic component further containing a monofunctional (meth)acrylic-based monomer in which a glass transition temperature (Tg) of the homopolymer of which is lower than 0° C.

In the present invention, the (meth)acrylic acid-based monomer is a (meth)acrylic-based monomer having a carboxyl group(s), and, for example, acrylic acid, methacrylic acid, maleic acid, crotonic acid, etc., may be mentioned. Among these, acrylic acid is particularly preferred. A content of the (meth)acrylic acid-based monomer is 1% by weight or more and 15% by weight or less, preferably 2% by weight or more and 10% by weight or less in a composite film precursor mentioned later. If the content of the (meth)acrylic acid-based monomer is less than 1% by weight, it takes a long time for the reaction, it is extremely difficult to make a film, and it causes a problem that strength of the film is not sufficient in some cases. If the content of the (meth)acrylic acid-based monomer exceeds 15% by weight, water absorption of the film becomes large, whereby it causes a problem in water resistance in some cases. When a composite film is used as the substrate, the (meth)acrylic acid-based monomer is a material which markedly affects to compatibility with the urethane component, and the acrylic component, so that it is an essential constitutional element having an extremely important function.

Incidentally, in the present invention, the term "film" is defined to be a concept including a sheet, and the term "sheet" is defined to be a concept including a film. In addition, in the present invention, the term "(meth)acrylic" such as a (meth)acrylic-based polymer and a (meth)acrylic acid-based monomer is defined to be a concept collectively calling methacrylic and acrylic. Further, even when it is mentioned as "acrylic", it is made a concept including methacrylic if there is no problem in general common sense.

In the present invention, the monofunctional (meth) acrylic-based monomer having Tg of 0° C. or higher may be mentioned, for example, acryloyl morpholine, isobornyl acrylate, dicyclopentanyl acrylate, t-butyl acrylate, cyclohexyl acrylate, lauryl acrylate, etc. These may be used alone, or two or more kinds in combination.

In the present invention, it is preferred to use at least one selected from the group consisting of acryloyl morpholine, isobornyl acrylate and dicyclopentanyl acrylate as a monofunctional (meth)acrylic-based monomer having Tg of 0° C. or higher, further preferred to use acryloyl morpholine and/or isobornyl acrylate, or acryloyl morpholine and/or dicyclopentanyl acrylate, and particularly preferred to use isobornyl acrylate.

A content of the monofunctional (meth)acrylic-based monomer having Tg of 0° C. or higher is preferably 20% by weight or more and 99% by weight or less in the acrylic components, further preferably 30% by weight or more and 98% by weight or less. If the content of the monofunctional (meth)acrylic-based monomer is less than 20% by weight, a problem that strength of the film is insufficient occurs in some cases, while if it exceeds 99% by weight, rigidity of the film becomes too high whereby the film becomes brittle in some cases.

In the present invention, the monofunctional (meth) acrylic-based monomer having Tg of less than 0° C. may be mentioned, for example, n-butyl acrylate, 2-ethylhexyl acrylate, isooctyl acrylate, isobutyl acrylate, 2-methoxyethyl acrylate, tetrahydrofurfuryl acrylate, phenoxyethyl acrylate, ethoxyethyl acrylate, 3-methoxybutylacrylate, etc. These may be used alone, or two or more kinds in combination.

In the present invention, it is particularly preferred to use n-butyl acrylate as the monofunctional (meth)acrylic-based monomer having Tg of less than 0° C.

The monofunctional (meth)acrylic-based monomer having Tg of less than 0° C. may not be contained (the content is 0% by weight), and the content when it is contained is preferably more than 0% by weight and 50% by weight or less in the acrylic component, further preferably more than 0% by weight and 45% by weight or less. If the content of the monofunctional (meth)acrylic-based monomer exceeds 50% by weight, a problem that strength of the film is insufficient occurs in some cases.

A kind(s), a combination, an amount(s) to be used of the (meth)acrylic-based monomer(s) are optionally determined by taking compatibility with the urethane, polymerizability at photocuring by radiation, etc., and characteristics of the resulting polymerized material into consideration.

In the present invention, in combination with the above-mentioned (meth)acrylic-based monomer(s), a monomer(s) such as vinyl acetate, vinyl propionate, styrene, acrylamide, methacrylamide, a mono- or di-ester of maleic acid and its derivative, N-methylol acrylamide, glycidyl acrylate, glycidyl methacrylate, N,N-dimethylaminoethyl acrylate, N,N-dimethylaminopropyl methacrylamide, 2-hydroxypropyl acrylate, N,N-dimethylacrylamide, N,N-diethylacrylamide, imide acrylate, N-vinylpyrrolidone, oligo ester acrylate, ε-caprolactone acrylate, dicyclopentanyl (meth)acrylate, dicyclopentenyl (meth)acrylate, methoxylated cyclododecatriene acrylate, methoxyethyl acrylate, etc., may be copolymerized. Incidentally, kinds or amounts to be used of these monomers to be copolymerized can be optionally determined by taking characteristics of the composite film, etc., into consideration.

Also, the other polyfunctional monomer(s) may be added within the range which does not impair the characteristics. The polyfunctional monomer may be mentioned ethylene glycol di(meth)acrylate, propylene glycol di(meth)acrylate, hexanediol di(meth)acrylate, neopentyl glycol di(meth)acrylate, trimethylolpropane tri(meth)acrylate, pentaerythritol tri(meth)acrylate, dipentaerythritol hexa(meth)acrylate, urethane acrylate, epoxy acrylate, polyester acrylate, etc., particularly preferably trimethylolpropane tri(meth)acrylate.

The polyfunctional monomer can be contained in an amount of 1 part by weight or more and 20 parts by weight or less based on 100 parts by weight of the acrylic-based monomer. If the content of the polyfunctional monomer is 1 part by weight or more, cohesive force of the composite film is sufficient, while if it is 20 parts by weight or less, modulus of elasticity never becomes too high, and the film can follow the unevenness at the surface of the adherend.

The urethane polymer constituting the composite film can be obtained by reacting a diol and a diisocyanate. For the reaction of the hydroxyl group of the diol and the isocyanate, a catalyst is generally used, but according to the present invention, the reaction can be proceeded without using a catalyst which causes burden on the environment such as dibutyltin dilaurate and tin octoate.

The diol with a low molecular weight may be mentioned a divalent alcohol such as ethylene glycol, diethylene glycol, propylene glycol, butylene glycol, hexamethylene glycol, etc.

Also, the diol with a high molecular weight may be mentioned a polyether polyol obtained by addition-polymerizing ethylene oxide, propylene oxide, tetrahydrofuran, etc., a polyester polyol comprising a polycondensate of an alcohol such as the above-mentioned divalent alcohol, 1,4-butanediol, 1,6-hexane diol, etc., and a divalent basic acid such as adipic acid, azelaic acid, sebacic acid, etc., or an acrylic polyol, a carbonate polyol, an epoxy polyol, a caprolactone polyol, etc. Among these, for example, polyoxytetramethylene glycol (PTMG), polyalkylene carbonate diol (PCD), etc., are preferably used.

The acrylic polyol may be mentioned, in addition to a copolymer of monomers having a hydroxyl group (a), a copolymer of a hydroxyl group-containing material and an acrylic-based monomer, etc. The epoxy polyol may be mentioned an amine-modified epoxy resin, etc.

In the present invention, the urethane polymer constituting the composite film does not contain a crosslinked structure. The diol to be used for formation of the urethane polymer is preferably a linear diol. Provided that as long as it satisfies the condition that no crosslinked structure is formed to the urethane polymer, the diol may be a side chain-state diol or a diol containing a branched structure. That is, the urethane polymer constituting the composite film of the present invention is a material not containing a crosslinked structure, and accordingly, it is a material structurally quite different from an IPN structure.

In the present invention, the above-mentioned diol may be used alone or in combination by taking solubility in the acrylic-based monomer and reactivity with the isocyanate into consideration. When strength is required, it is effective to increase an amount of the urethane hard segment by the low molecular weight diol. When elongation is important, it is preferred to use a diol having a large molecular weight alone. Also, the polyether polyol is generally inexpensive and has good water resistance, and the polyester polyol has high strength. In the present invention, a kind(s) or an amount(s) of the polyol(s) can be freely selected depending on the uses or purposes, and a kind(s), a molecular weight or an amount(s) to be used of the polyol can be optionally selected in the viewpoints of characteristics of the substrate to be coated, etc., reactivity with the isocyanate, compatibility with the acrylic materials, etc.

The above-mentioned diisocyanate may be mentioned an aromatic, aliphatic or alicyclic diisocyanate, and a dimer, a trimer, etc., of these diisocyanates, etc. The aromatic, aliphatic or alicyclic diisocyanate may be mentioned, for example, tolylene diisocyanate (TDI), diphenylmethane diisocyanate (MDI), xylylene diisocyanate (XDI), naphthylene diisocyanate (NDI), phenylene diisocyanate (PPDI), m-tetramethylxylylene diisocyanate (TMXDI), methylcyclohexanediisocyanate (hydrogenatedTDI), dicyclohexylmethane diisocyanate (hydrogenated MDI), cyclohexane diisocyanate (hydrogenated PPDI), bis(isocyanatomethyl) cyclohexane (hydrogenated XDI), norbornene diisocyanate (NBDI), isophorone diisocyanate (IPDI), hexamethylene diisocyanate (HDI), butane diisocyanate, 2,4-trimethylhexamethylene diisocyanate, 2,4,4-trimethylhexamethylene diisocyanate, etc. Also, a dimer or a trimer thereof, or a polyphenylmethane diisocyanate may be used. The trimer may be mentioned an isocyanurate type, a buret type, an allophanate type, etc., and can be optionally used.

Among these, in particular, preferably used is an aliphatic or alicyclic-based diisocyanate such as methylcyclohexane diisocyanate (hydrogenated TDI), dicyclohexylmethane diisocyanate (hydrogenated NIDI), cyclohexane diisocyanate (hydrogenated PPDI), bis(isocyanatomethyl)cyclohexane (hydrogenated XDI) norbornene diisocyanate (NBDI), isophorone diisocyanate (IPDI), hexamethylene diisocyanate (HDI), butane diisocyanate, 2,4-trimethylhexamethylene diisocyanate, 2,4,4-trimethylhexamethylene diisocyanate, etc. This is because if an aromatic-based diisocyanate containing a benzene ring is used, a colored substance having a conjugated structure is easily formed by the photoreaction so that it is not preferred, and in the present invention, a difficultly yellowing type or a non-yellowing type aliphatic or alicyclic-based diisocyanate containing no benzene ring is preferably used.

These diisocyanates may be used alone or in combination. A kind(s), combination, etc., of the diisocyanate may be optionally selected in the viewpoints of characteristics of the support to which the composite film is applied (to be coated, etc.), etc., solubility in the acrylic-based monomer, reactivity with the hydroxyl group, etc.

In the present invention, the urethane-based polymer constituting the composite film is preferably formed by using at least one kind of the diisocyanate selected from the group consisting of hexamethylene diisocyanate (HDI), hydrogenated tolylene diisocyanate (HTDI), hydrogenated 4,4-diphenylmethane diisocyanate (HMDI), isophorone diisocyanate (IPDI) and hydrogenated xylene diisocyanate (HXDI), and hydrogenated xylene diisocyanate is particularly preferably used.

In the composite film, amounts to be used of the diol component and the diisocyanate component for forming the urethane polymer is preferably NCO/OH (an equivalent ratio) of 1.1 or more and 2.0 or less, further preferably 1.12 or more and 1.60 or less, and particularly preferably 1.15 or more and 1.40 or less. If NCO/OH (an equivalent ratio) is less than 1.1, the molecular weight of the urethane polymer becomes too large, whereby a viscosity of a composite film precursor (a syrup solution) is large and an operation in the subsequent sheet-forming process becomes difficult in some cases. Also, if NCO/OH (an equivalent ratio) exceeds 2.0, the molecular weight of the urethane polymer becomes small, whereby breaking strength is likely lowered.

In the present invention, a ratio of the acrylic component and the urethane component for forming the composite film is, in a weight ratio, the acrylic component/the urethane component of 0.25 or more and 4.00 or less, preferably 0.4 or more and 2.4 or less, and particularly preferably 0.5 or more and 1.9 or less. If the acrylic component/the urethane component is less than 0.25, a viscosity of the syrup solution is large and an operation in the subsequent sheet-forming process becomes difficult in some cases. Also, if the acrylic component/the urethane component exceeds 4.00, an amount of the urethane polymer in the composite film is less than 25%, whereby a tensile breaking strength is lowered so that it cannot endure for practical use in some cases.

A hydroxyl group-containing acrylic monomer may be added to the above-mentioned urethane polymer. By adding the hydroxyl group-containing acrylic monomer, a (meth) acryloyl group can be introduced into the molecular end of the urethane prepolymer, which imparts copolymerizability with the (meth)acrylic-based monomer, heightens compatibility between the urethane component and the acrylic component, and can improve S—S characteristics such as breaking strength, etc. The hydroxyl group-containing acrylic monomer herein used may be mentioned hydroxyethyl (meth)acrylate, hydroxypropyl (meth)acrylate, hydroxybutyl (meth)acrylate, hydroxyhexyl (meth)acrylate, etc. An amount to be used of the hydroxyl group-containing acrylic monomer is preferably 0.1 to 10 parts by weight based on 100 parts by weight of the urethane polymer, more preferably 1 to 5 parts by weight.

A small amount of a solvent may be added for adjustment of the viscosity for coating. The solvent may be optionally selected from the solvents generally used and may be mentioned, for example, ethyl acetate, toluene, chloroform, dimethylformamide, etc.

In the present invention, the composite film can be formed, for example, using an acrylic-based monomer as a diluent, by reacting a diol and a diisocyanate in the acrylic-based monomer to form a urethane polymer, coating a mixture containing the acrylic-based monomer and the urethane polymer as main components onto a support (which has been subjected to peeling treatment depending on necessity), etc., irradiating ionizing radiation such as α-ray, β-ray, γ-ray, neutron beam, electron beam, etc., radiation such as ultra-violet ray, etc., or visible light, etc., depending on the kind(s) of the photopolymerization initiator(s), etc., to cure the mixture, thereafter, peeling and removing the support, etc., to form a composite film. Or else, it can be obtained in the form in which the composite film is laminated on the support, etc., without peeling and removing the support, etc.

More specifically, the diol is dissolved in the acrylic-based monomer, then, the diisocyanate, etc., is added thereto to react with the diol to carry out adjustment of the viscosity, the product is coated onto the support, etc., or onto the peeling treatment surface of the support, etc., depending on necessity, and then, curing the same by using a low pressure mercury lamp, etc., to obtain a composite film. According to this method, the acrylic-based monomer may be added at once during the synthesis of the urethane, or may be added by dividing into several times. Also, after dissolving the diisocyanate in the acrylic-based monomer, the diol may be reacted. According to this method, the molecular weight is never limited, and a high molecular weight polyurethane can be formed, so that the molecular weight of the finally obtained urethane can be designed to an optional size.

At this time, to avoid inhibition of polymerization by oxygen, oxygen may be shielded by placing a sheet (a separator, etc.) which has been subjected to peeling treatment onto a mixture coated onto the substrate sheet, etc., or the substrate is charged into an apparatus filled with an inert gas and the oxygen concentration may be reduced.

In the present invention, a kind of the radiation, etc., or a kind of a lamp to be used for irradiation may be optionally selected, and a low pressure lamp such as a fluorescent chemical lamp, a black light, a sterilization lamp, etc., and a high pressure lamp such as a metal halide lamp, a high pressure mercury lamp, etc., may be used.

An irradiation dose such as ultraviolet ray, etc., may be optionally set depending on the required characteristics of the film. The irradiation dose of the ultraviolet ray is generally 100 to 5,000 mJ/cm$^2$, preferably 1,000 to 4,000 mJ/cm$^2$, more preferably 2,000 to 3,000 mJ/cm$^2$. If the irradiation dose of the ultraviolet ray is less than 100 mJ/cm$^2$, a sufficient polymerization rate cannot be obtained in some cases, while if it is larger than 5,000 mJ/cm$^2$, it becomes a cause of deterioration in some cases.

Also, a temperature at the time of irradiating the ultraviolet ray is not specifically limited and can be optionally set, but the temperature is too high, a termination reaction is likely caused by a polymerization heat, which likely becomes a cause of lowering characteristics, so that it is generally 70° C. or lower, preferably 50° C. or lower, more preferably 30° C. or lower.

In the mixture comprising the urethane polymer and the acrylic-based monomer to be used for formation of the composite film as effective ingredients, a photopolymerization initiator is contained. The photopolymerization initiator can be used without any specific limitation and may be used, for example, a ketal-based photopolymerization initiator, an α-hydroxy ketone-based photopolymerization initiator, an α-amino ketone-based photopolymerization initiator, an acylphosphine oxide-based photopolymerization initiator, a benzophenone-based photopolymerization initiator, a thioxanthone-based photopolymerization initiator, a benzoin ether-based photopolymerization initiator, an acetophenone-based photopolymerization initiator, an aromatic sulfonyl chloride-based photopolymerization initiator, a photoactive oxime-based photopolymerization initiator, a benzoin-based photopolymerization initiator, a benzyl-based photopolymerization initiator, etc.

The ketal-based photopolymerization initiator may be mentioned, for example, 2,2-dimethoxy-1,2-diphenylethan-1-one (as the commercially available material, "Irgacure 651" available from Ciba Speciality Chemicals Corporation, etc.), etc.

The α-hydroxy ketone-based photopolymerization initiator may be mentioned, for example, 1-hydroxycyclohexyl phenyl ketone (as the commercially available material, "Irgacure 184" available from Ciba Japan, K.K., etc.), 2-hydroxy-2-methyl-1-phenylpropan-1-one (as the commercially available material, "Darocur 1173" available from Ciba Japan, K.K., etc.), 1-[4-(2-hydroxyethoxy)-phenyl]-2-hydroxy-2-methyl-1-propan-1-one (as the commercially available material, "Irgacure 2959" available from Ciba Japan, K.K., etc.), etc.

The α-amino ketone-based photopolymerization initiator may be mentioned, for example, 2-methyl-1-[4-(methylthio) phenyl]-2-morpholinopropan-1-one (as the commercially available material, "Irgacure 907" available from Ciba Japan, K.K., etc.), 2-benzyl-2-dimethylamino-1-(4-morpholinophenyl)-butanone-1 (as the commercially available material, "Irgacure 369" available from Ciba Japan, K.K., etc.), etc.

The acyl phosphine oxide-based photopolymerization initiator may be mentioned, for example, 2,4,6-trimethylbenzoyl diphenylphosphine oxide (as the commercially available material, "Lucirin TPO" available from BASF SE, etc.), etc.

The benzoin ether-based photopolymerization initiator may be mentioned, for example, benzoin methyl ether, benzoin ethyl ether, benzoin propyl ether, benzoin isopropyl ether, benzoin isobutyl ether, 2,2-dimethoxy-1,2-diphenylethan-1-one, anisole methyl ether, etc.

The acetophenone-based photopolymerization initiator may be mentioned, for example, 2,2-diethoxyacetophenone, 2,2-dimethoxy-2-phenylacetophenone, 1-hydroxycyclohexyl phenyl ketone, 4-phenoxydichloroacetophenone, 4-(t-butyl)dichloroacetophenone, etc.

The aromatic sulfonyl chloride-based photopolymerization initiator may be mentioned, for example, 2-naphthalene sulfonyl chloride, etc., and the photoactive oxime-based photopolymerization initiator may be mentioned, for example, 1-phenyl-1,1-propanedione-2-(o-ethoxycarbonyl)-oxime, etc.

The benzoin-based photopolymerization initiator may be mentioned, for example, benzoin, etc., and the benzyl-based photopolymerization initiator may be mentioned, for example, benzyl, etc.

The benzophenone-based photopolymerization initiator may be mentioned, for example, benzophenone, benzoylbenzoic acid, 3,3'-dimethyl-4-methoxybenzophenone, polyvinylbenzophenone, α-hydroxycyclohexyl phenyl ketone, etc.

The thioxanthone-based photopolymerization initiator may be mentioned, for example, thioxanthone, 2-chlorothioxanthone, 2-methylthioxanthone, 2,4-dimethylthioxanthone, isopropylthioxanthone, 2,4-diisopropylthioxanthone, dodecylthioxanthone, etc.

In the present invention, the substrate is preferably a laminated sheet having a substrate layer and a surface protective layer. Provided that the surface protective layer is provided at an outermost surface of the adhesive sheet. The surface protective layer preferably comprises a fluorine-based resin, a urethane-based polymer, an acrylic-based resin, etc., as effective ingredients. Here, the terms "as effective ingredients" are not specifically limited as long as it can develop the function and, for example, mean that the resin components occupy 50% by weight or more in the surface protective layer after the formation thereof, preferably occupy 55% by weight or more, more preferably 60% by weight or more. Incidentally, in the present invention, when it is designated as the effective ingredient, these have the same meanings as mentioned above.

The fluorine-based resin to be used in the surface protective layer may be preferably mentioned those having a fluoroethylene vinyl ether alternating copolymer and, for example, preferably having a fluoroethylene vinyl ether alternating copolymer represented by the following formula (I).

[Formula 1]

In the above-mentioned formula (I), X represents fluorine, chlorine or bromine, Ra represents hydrogen or a C1 to C10 alkyl group, Rb represents a C1 to C16 alkyl group, Rc represents a C1 to C16 alkylene group, m and n each represent an integer, and selected in the range in which the weight average molecular weight of the fluoroethylene vinyl ether alternating copolymer becomes 1,000 to 2,000,000.

A weight average molecular weight of the fluoroethylene vinyl ether alternating copolymer is 1,000 to 2,000,000, preferably 5,000 to 1,000,000, more preferably 10,000 to 500,000. In the present invention, m and n in the above-mentioned formula (I) is selected in the range in which the weight average molecular weight of the fluoroethylene vinyl ether alternating copolymer becomes 1,000 to 2,000,000.

The weight average molecular weight of the fluoroethylene vinyl ether alternating copolymer can be measured by the GPC method. The measurement method of the GPC method is shown below. That is, the fluoroethylene vinyl ether alternating copolymer is adjusted so that it becomes 2.0 g/L by using a THF solution, and then, allowed to stand for 12 hours. Thereafter, this solution is filtered through a 0.45 μm membrane filter, and the filtrate is subjected to GPC measurement by using "HLC-8120GPC" manufactured by Tosoh Corporation as an analytical device, under the following mentioned measurement conditions.

Measurement Conditions:

| | |
|---|---|
| Column | TSK gel GMH-H(S) × 2 |
| Column size | 7.8 mm I.D. × 300 mm |
| Eluent | THF |
| Flow amount | 0.5 mL/min |
| Detector | RI |
| Column temperature | 40° C. |
| Injection amount | 100 μL |

The urethane-based polymer to be used for the formation of the surface protective layer is preferably an aqueous-based urethane polymer or a solvent-based urethane polymer. The urethane polymer is necessary to be liquified for the processing, etc., the liquified urethane using an organic solvent such as toluene, etc., is called as a solvent-based urethane polymer, and many of the urethane polymers are an organic solvent-based material. On the other hand, the aqueous-based urethane polymer means a liquefied urethane using water in place of the organic solvent, and the aqueous-based urethane polymer can be liquefied without using an organic solvent so that it can be said to be a material friendly to the environment.

The aqueous-based urethane polymer to be preferably used in the present invention may be mentioned, for example, a carbonate-based polymer, a polycarbonate-based polymer, an ester-based polymer, an ether-based polymer, an ester/acrylic-based polymer, etc.

The carbonate-based aqueous-based urethane polymer may be mentioned, for example, trade name: "F-8082D" (100% modulus 24 N/mm$^2$), trade name: "Superflex 420" (100 modulus 17 N/mm$^2$), trade name: "F-2954D" (100% modulus 5 N/mm$^2$), trade name: "F-2954D-5" (100% modulus 12 N/trade name: "Superflex 470" (100% modulus 2.5 N/mm$^2$), trade name: "Superflex 460" (100% modulus 0.9 N/mm$^2$), "F-2968D" (100% modulus 1.5 N/mm$^2$), etc., all available from DKS Co., Ltd., as commercially available products, the ester-based aqueous-based urethane polymer may be mentioned trade name: "HUX 232" (100% modulus 25 N/mm$^2$), trade name: "HUX-380" (100 modulus 8.4 N/mm$^2$), trade name: "HUX-210" (100% modulus 2.1 N/mm$^2$), etc., all available from ADEKA CORPORATION as commercially available products, the polycarbonate-based aqueous-based urethane polymer may be mentioned trade name: "HUX-561" (100% modulus 5 N/mm$^2$), trade name: "HUX-564", etc., all available from ADEKA CORPORATION as commercially available products, the ether-based aqueous-based urethane polymer may be mentioned trade name: "HUX-350" (100% modulus 25 N/mm$^2$), trade name: "HUX-550" (100% modulus 27 N/mm$^2$ (10%)), etc., all available from ADEKA CORPORATION as commercially available products, and the ester/acrylic-based aqueous-based urethane polymer may be mentioned trade name: "HUX 401" (100% modulus 19 N/mm$^2$), etc., available from ADEKA CORPORATION as commercially available products.

In the present invention, when the surface protective layer contains an acrylic-based resin as an effective ingredient, the acrylic-based resin preferably contains a (meth)acrylic-based polymer having a hydroxyl value of 20 to 120 (KOH mg/g), and the surface protective layer is preferably a layer containing a crosslinked product comprising a (meth)acrylic-based polymer having a hydroxyl value 20 to 120 (KOH mg/g) and a crosslinking agent. The hydroxyl value of the (meth)acrylic-based polymer is more preferably 20 to 100 (KOH mg/g), further preferably 20 to 80 (KOH mg/g), particularly preferably 30 to 70 (KOH mg/g), and most preferably 40 to 60 (KOH mg/g). By using the (meth)acrylic-based polymer having a hydroxyl value of 20 to 120 (KOH mg/g), a crosslinking density of the surface protective layer can be heightened whereby permeation of the solvent into the substrate can be effectively prevented. If the hydroxyl value of the (meth)acrylic-based polymer is less than 20 (KOH mg/g), an effect of solvent resistance cannot sufficiently be obtained in some cases, while if the hydroxyl value exceeds 120 (KOH mg/g), flexibility is likely poor whereas it is excellent in solvent resistance.

In the present invention, as the (meth)acrylic-based polymer forming the surface protective layer, a material having a hydroxyl value of 20 to 120 (KOH mg/g) can be used without any specific limitation.

Provided that, in the present invention, the acrylic-based resin for forming the surface protective layer preferably used is a Hulls-hybrid (meth)acrylic-based polymer. The Hulls-hybrid (meth)acrylic-based polymer is an acrylic-based polymer in which a reaction type hindered amine-based photostabilizer (HALS: Hinderd Amine Light Stabilizer) and a reaction type WA (ultraviolet absorber) are copolymerized. By using the Hulls-hybrid (meth)acrylic-based polymer, long term weather resistance can be provided to the surface protective layer.

To satisfy the requirement of improving weather resistance, it has been investigated to use various kinds of weather resistance improving agents including WA (ultraviolet absorber). More specifically, a ultraviolet absorber, a photostabilizer, an antioxidant, a peroxide decomposing agent, a quencher, etc., are preferably used. Among these, effects of the hindered amine photostabilizer and the ultraviolet absorber are remarkable, and accordingly, these have widely been used. For improving weather resistance of the resins such as an olefin, a urethane, a polyester, etc., which are base resins of general purpose plastic products, addition of the photostabilizer and/or the ultraviolet absorber is essential, and these act extremely effectively. However, the photostabilizer or the ultraviolet absorber is volatilized at the time of molding processing at high temperature, or eluted into a liquid (water, detergent, etc.) to be contacted with at the time of exposure for a long period of time, so that lowering in the effect cannot be avoided. Furthermore, in the foam of a coating film, a thickness of the coating film is thin with a thickness of several μm to several ten μm, and an addition type photostabilizer or an addition type the ultraviolet absorber which is easily transferable is eluted within a short period of time, whereby there is a problem that continuity of the effect is poor.

Thus, for preventing from volatilization or elution of the photostabilizer or the ultraviolet absorber, and further for bringing out of the functions of these additives effectively, it is most preferred that a reaction type photostabilizer or a reaction type ultraviolet absorber is used with a polymer as a binder with good combination.

The surface protective layer constituting the substrate of the present invention can be formed by adding a crosslinking agent to a resin (a fluorine-based resin, a urethane-based polymer, an acrylic-based resin) for forming the above-mentioned surface protective layer, and also adding a diluting solvent, etc., depending on necessity, to prepare a coating solution, and it is coated onto the substrate layer, etc., to form a surface protective layer. Or else, a surface protective layer is formed onto a temporary support in a film state, and overlapping with the substrate layer to form a substrate, or a laminated material of the substrate and the surface protective layer may be formed by the other methods. That is, for example, a coating solution containing the (meth)acrylic-based polymer and the crosslinking agent, etc., is coated onto at least one surface of the substrate layer, and heat cured to make a crosslinked material with a three-dimensionally crosslinked structure to obtain a surface protective layer.

The crosslinking agent to be used for the formation of the surface protective layer of the present invention may be mentioned an isocyanate-based crosslinking agent, an oxazoline-based crosslinking agent, etc.

The isocyanate-based crosslinking agent may be mentioned, for example, a di-functional isocyanate such as hydrogenated xylylene diisocyanate, hexamethylene diisocyanate, isophorone diisocyanate, hydrogenated diphenylmethane diisocyanate, ethylene diisocyanate, 1,4-tetramethylene diisocyanate, trimethylhexamethylene diisocyanate, norbornene diisocyanate, Duranate AE700 (available from Asahi Kasei Chemicals Corporation), etc., a tri-functional isocyanate such as Desmodur N3200 (available from Sumika Bayer Urethane Ltd.), Coronate L (available from Nippon Polyurethane Industry Co., Ltd.), Coronate HL (available from Nippon Polyurethane Industry Co., Ltd.), Coronate HX (available from Nippon Polyurethane Industry Co., Ltd.), Takenate D-140N (available from Mitsui Chemical Polyurethanes Inc.), Takenate D-127 (available from Mitsui Chemical Polyurethanes Inc.), Takenate D-110N (available from Mitsui Chemical Polyurethanes Inc.), Duranate TSE-100 (available from Asahi Kasei Chemicals Corporation), Duranate E402 (available from Asahi Kasei Chemicals Corporation), Duranate E405 (available from Asahi Kasei Chemicals Corporation), Sumidur N3300 (available from Sumika Bayer Urethane Ltd.), etc. Among these, hexamethylene diisocyanate non-yellowing type polyisocyanate may be mentioned as a preferred material. Also, the aliphatic-based diisocyanate or the oxazoline-based crosslinking agent may be mentioned, for example, EPOCROS WS-700 (available from Nippon Shokubai Co., Ltd.), etc., as commercially available products.

In the present invention, the surface protective layer may further contain a catalyst. The catalyst to be used may be mentioned, for example, dibutyltin dilaurate, etc., and trade name: "OL1" available from Tokyo Fine Chemical CO., LTD., can be commercially obtained.

Also, a coating solution for the surface protective layer may be formed by using a solvent, if necessary. The solvent to be used may be mentioned, for example, toluene, methyl ethyl ketone, hexane, xylene, ethyl acetate, etc., and two or more kinds may be used in combination.

In the present invention, in the structure in which the substrate comprises a surface protective layer formed onto at least one of the surfaces of the substrate layer, various kinds of discharging treatment, anchor coating treatment, etc., may be applied to the surface of the substrate layer for improving adhesiveness between the substrate layer and the surface protective layer.

In the present invention, a thickness of the surface protective layer is preferably 2 to 50 μm, more preferably 5 to 40 μm, further preferably 8 to 30 μm. If the thickness of the surface protective layer is less than 2 μm, a defective portion(s) at which no surface protective layer is formed such as a pin hole(s), etc., is/are likely generated, and characteristics of the surface protective layer cannot sufficiently be developed in some cases. If it exceeds 50 μm, physical properties of the surface protective layer lower physical properties of the substrate layer in some cases.

To the respective layers of the adhesive sheet of the present invention, that is, for example, to the substrate layer, the surface protective layer, the adhesive layer, etc., additives generally used, for example, the ultraviolet absorber, an antioxidant, an antiaging agent, a filler, a pigment, a colorant, a flame retardant, an antistatic agent, a photostabilizer, a levelling agent, a thickener, etc., may be added within the range which does not impair the effect of the present invention, if necessary. These additives may be used with a usual amount depending on the kind thereof.

When a ultraviolet absorber is added, the ultraviolet absorber is preferably added to the substrate layer or the surface protective layer. The ultraviolet absorber (WA) may be mentioned, for example, as the benzotriazole-based ultraviolet absorber, 2-(2-hydroxy-5-tert-butylphenyl)-2H-benzotriazole (for example, "TINUVIN PS" available from Ciba Japan, K.K.), an ester compound of benzenepropanoic acid and 3-(2H-benzotriazol-2-yl)-5-(1,1-dimethylethyl)-4-hydroxy ($C_7$ to $C_9$ branched and linear alkyl) (for example, "TINUVIN 384-2" available from Ciba Japan, K.K.), a mixture of octyl-3-[3-tert-butyl-4-hydroxy-5-(5-chloro-2H-benzotriazol-2-yl)phenyl]propionate and 2-ethylhexyl-3-[3-tert-butyl-4-hydroxy-5-(5-chloro-2H-benzotriazol-2-yl)phenyl]propionate (for example, "TINUVIN 109" available from Ciba Japan, K.K.), 2-(2H-benzotriazol-2-yl)-4,6-bis(1-methyl-1-phenylethyl) phenol (for example, "TINUVIN 900" available from Ciba Japan, K.K.), 2-(2H-benzotriazol-2-yl)-6-(1-methyl-1-phenylethyl)-4-(1,1,3,3-tetramethylbutyl)phenol (for example, "TINUVIN 928" available from Ciba Japan, K.K.), a reaction product of methyl-3-(3-(2H-benzotriazol-2-yl)-5-tert-butyl-4-hydroxyphenyl)propionate/polyethylene glycol 300 (for example, "TINUVIN 1130" available from Ciba Japan, K.K.), 2-(2H-benzotriazol-2-yl)-p-cresol (for example, "TINUVINP" available from Ciba Japan, K.K.), 2-[5-chloro(2H)-benzotriazol-2-yl]-4-methyl-6-(tert-buty 1)phenol (for example, TINUVIN 326" available from Ciba Japan, K.K.), 2-(2H-benzotriazol-2-yl)-4,6-di-tert-pentylphenol (for example, "TINUVIN 328" available from Ciba Japan, K.K.), 2-(2H-benzotriazol-2-yl)-4-(1,1,3,3-tetramethylbutyl)phenol (for example, "TINUVIN 329" available from Ciba Japan, K.K.), 2-2'-methylenebis[6-(2H-benzotriazol-2-yl)-4-(1,1,3,3-tetramethylbutyl)phenol] (for example, "TINUVIN 360" available from Ciba Japan, K.K.), a reaction product of methyl-3-(3-(2H-benzotriazol-2-yl)-5-tert-butyl-4-hydroxyphenyl)propionate and polyethylene glycol 300 (for example, "TINUVIN 213" available from Ciba Japan, K.K.), 2-(2H-benzotriazol-2-yl)-6-dodecyl-4-methylphenol (for example, "TINUVIN 571" available from Ciba Japan, K.K.), 2-[2-hydroxy-3-(3, 4,5,6-tetrahydrophthalimide-methyl)-5-methylphenyl]benzotriazole (for example, "Sumisorb 250" available from Sumitomo Chemical Co., Ltd.), 2,2'-methylenebis[6-(benzotriazol-2-yl)-4-tert-octylphenol] (for example, "ADK-STAB LA31" available from ADEKA CORPORATION), etc. Also, a water dispersion type benzotriazole-based ultraviolet absorber may be mentioned "UC-606" available from ADEKA CORPORATION, etc., as a commercially available product.

Also, the hydroxyphenyltriazine-based ultraviolet absorber may be mentioned, for example, a reaction product of 2-(4,6-bis(2,4-dimethylphenyl)-1,3,5-triazin-2-yl)-5-hydroxyphenyl and [(C10 to C16, mainly C12 to C13 alkyloxy)methyl]oxirane (for example, "TINUVIN 400" available from Ciba Japan, K.K.), a reaction product of 2-(2,4-dihydroxyphenyl)-4,6-bis-(2,4-dimethylphenyl)-1,3,5-triazine and (2-ethylhexyl)-glycidic acid ester (for example, "TINUVIN 405" available from Ciba Japan, K.K.), 2,4-bis[2-hydroxy-4-butoxyphenyl]-6-(2,4-dibutoxyphenyl)-1,3,5-triazine (for example, "TINUVIN 460" available from Ciba Japan, K.K.), 2-(4,6-diphenyl-1,3,5-triazin-2-yl)-5-[(hexyl)oxy]-phenol (for example, "TINUVIN 1577" available from Ciba Japan, K.K.), 2-(2-hydroxy-4-[1-octyloxycarbonylethoxy]phenyl)-4,6-bis (4-phenylphenyl)-1,3,5-triazine (for example, "TINUVIN 479" available from Ciba Japan, K.K.), etc.

The benzophenone-based ultraviolet absorber may be mentioned, for example, "CHIMASSORB 81" available from Ciba Japan, K.K., etc. Also, the benzoate-based ultraviolet absorber may be mentioned, for example, 2,4-di-tert-butylphenyl-3,5-di-tert-butyl-4-hydroxybenzoate (for example, "TINUVIN 120" available from Ciba Japan, K.K.), etc.

In the present invention, the above-mentioned the ultraviolet absorbers may be used alone or in combination of two or more kinds.

When the ultraviolet absorber is added to the substrate layer, a total amount of the ultraviolet absorber to be used is preferably 0.1% by weight or more and 4.0% by weight or less based on 100% by weight of the substrate layer, more preferably 0.5% by weight or more and 2.0% by weight or less. If the content of the ultraviolet absorber is 0.1% by weight or more, absorption of the ultraviolet ray causing deterioration or coloring is sufficient, while if it is 4.0% by weight or less, no coloring by the ultraviolet absorber itself is caused.

The photostabilizer to be used in the present invention may be mentioned a hindered amine photostabilizer (HALS), a water dispersion type photostabilizer, etc. The hindered amine photostabilizer to be used in the present invention may be mentioned, for example, a polymerized product of dimethyl succinate and 4-hydroxy-2,2,6,6-tetramethyl-1-piperidine ethanol (for example, "TINUVIN 622" available from Ciba Japan, K.K.), a 1:1 reaction product of a polymerized product of dimethyl succinate and 4-hydroxy-2,2,6,6-tetramethyl-1-piperidine ethanol with N,N',N'',N'''-tetrakis-(4,6-bis-(butyl-(N-methyl-2,2,6,6-tetramethylpiperidin-4-yl)amino)-triazin-2-yl)-4,7-diazadecane-1,10-diamine (for example, "TINUVIN 119" available from Ciba Japan, K.K.), a polycondensate of dibutylamine-1,3-triazine-N,N'-bis(2,2,6,6-tetramethyl-4-piperidyl-1,6-hexamethylenediamine and N-(2,2,6,6-tetramethyl-4-piperidyl)butylamine (for example, "TINUVIN 2020" available from Ciba Japan, K.K.), poly[{6-(1,1,3,3-tetramethylbutyl)amino-1,3,5-triazin-2,4-diyl}(2,2,6,6-tetramethyl-4-piperidyliminolhexamethylene{(2,6,6-tetramethyl-4-piperidyl)-imino}) (for example, "TINUVIN 944" available from Ciba Japan, K.K.), a mixture of bis(1,2,2,6,6-pentamethyl-4-piperidyl)sebacate and methyl-1,2,2,6,6-pentamethyl-4-piperidylsebacate (for example, "TINUVIN 765" available from Ciba Japan, K.K.), bis(2,2,6,6-tetramethyl-4-piperidyl)sebacate (for example, "TINUVIN 770" available from Ciba Japan, K.K.), a reaction product of decanedioic acid bis(2, 2,6,6-tetramethyl-1-(octyloxy)-4-piperidinyl) ester (1,1-dimethylethylhydroperoxide) and octane (for example, "TINUVIN 123" available from Ciba Japan, K.K.), bis(1, 2,2,6,6-pentamethyl-4-piperidyl)[[3,5-bis(1,1-dimethylethyl)-4-hydroxyphenyl]methyl]butyl malonate (for example, "TINUVIN 144" available from Ciba Japan, K.K.), a reaction product of a reaction product of cyclohexane and peroxy N-butyl-2,2,6,6-tetramethyl-4-piperidine-amine-2,4,6-trichloro-1,3,5-triazine with 2-amino ethanol (for example, "TINUVIN 152" available from Ciba Japan, K.K.), a mixture of bis(1,2,2,6,6-pentamethyl-4-piperidyl)sebacate and methyl-1,2,2,6,6-pentamethyl-4-piperidylsebacate (for example, "TINUVIN 292" available from Ciba Japan, K.K.), etc. Also, a water dispersion type photostabilizer may be mentioned "UC-606" available from ADEKA CORPORATION, etc., as a commercially available product.

In the present invention, the substrate may be laminated with the other film(s) to the substrate layer within the range which does not impair the effect of the present invention. A material(s) for forming the other film(s) may be mentioned, for example, a thermoplastic resin including a polyester-based resin such as polyethylene terephthalate (PET), etc., a polyolefin-based resin such as polyethylene (PE), a polypropylene (PP), etc., a polyimide (PI), a polyether ether ketone (PEEK), a polyvinyl chloride (PVC), a polyvinylidene chloride-based resin, a polyamide-based resin, a polyurethane-based resin, a polystyrene-based resin, an acrylic-based resin, a fluorine-based resin, a cellulose-based resin, a polycarbonate-based resin, etc., as well as a thermosetting resin, etc.

The adhesive sheet of the present invention preferably has a constitution that the substrate has a substrate layer and a surface protective layer, more specifically, it is preferred to have a constitution that a surface protective layer is provided as the outermost surface layer of the substrate, and an adhesive layer is provided at the other side of the surfaces of the substrate, that is, onto the substrate layer.

An adhesive agent to form the adhesive layer is not particularly limited, and a general material may be used such as an acrylic-based, a rubber-based, a silicone-based material, etc., and an acrylic-based adhesive agent is preferred by taking adhesiveness at low temperature, retaining property at high temperature, in respect of cost, etc., into consideration.

The acrylic-based adhesive agent which can be used may be mentioned an acrylic-based adhesive agent containing an acrylic-based copolymer(s) (which may be two or more kinds) in which a monomer component mainly comprising an acrylic acid ester(s) is copolymerized with a monomer component having a functional group(s) such as a carboxyl group and a hydroxyl group, etc.

The acrylic acid ester may be mentioned, for example, methyl (meth)acrylate, ethyl (meth)acrylate, n-propyl (meth)acrylate, isopropyl (meth)acrylate, n-butyl (meth) acrylate, isobutyl (meth)acrylate, sec-butyl (meth)acrylate, t-butyl (meth)acrylate, pentyl (meth)acrylate, isopentyl (meth)acrylate, hexyl (meth)acrylate, cyclohexyl (meth)acrylate, heptyl (meth)acrylate, n-octyl (meth)acrylate, isooctyl (meth)acrylate, 2-ethylhexyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, eicosyl (meth)acrylate, isobornyl (meth)acrylate, 1-adamantyl (meth)acrylate, etc. These alkyl (meth)acrylates may be used a single kind or two or more kinds.

With the above-mentioned alkyl (meth)acrylate(s) may be copolymerized the following monomer component(s). A copolymerizable monomer component may be mentioned, for example, a monomer containing a carboxyl group such as (meth)acrylic acid, itaconic acid, maleic acid, crotonic acid, fumaric acid, carboxyethyl (meth)acrylate, carboxypentyl (meth)acrylate, etc.; a monomer containing a hydroxyl group such as 2-hydroxyethyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, (4-hydroxymethylcyclohexyl)-methyl acrylate, etc.; a glycidyl group-containing monomer such as glycidyl (meth)acrylate, methylglycidyl (meth)acrylate, etc.; a cyanoacrylate-based monomer such as acrylonitrile, methacrylonitrile, etc.; a nitrogen-containing monomer such as N,N-dimethylaminoethyl (meth)acrylate, N,N-dimethylaminopropyl (meth)acrylamide, N,N-dimethyl (meth)acrylamide, N,N-diethyl (meth)acrylamide, N-isopropyl (meth)acrylamide, N-hydroxyethyl (meth)acrylamide, (meth)acryloyl morpholine, N-vinyl-2-piperidone, N-vinyl-3-morpholinone, N-vinyl-2-caprolactam, N-vinyl-2-pyrrolidone, N-vinyl-1,3-oxazin-2-one, N-vinyl-3,5-morpholinedione, N-cyclohexylmaleimide, N-phenylmaleimide, N-acryloylpyrrolidine, t-butylaminoethyl (meth)acrylate, etc., a monomer such as styrene or a derivative of the styrene, vinyl acetate, etc. These monomers may be used one kind or two or more kinds by copolymerizing with the (meth)acrylic acid ester(s), if necessary.

The adhesive agent to be used in the present invention preferably contains at least one kind selected from the group consisting of 2-ethylhexyl acrylate and isononyl acrylate, and at least one kind of a carboxyl group-containing monomer selected from the group consisting of acrylic acid and methacrylic acid. That is, as the adhesive agent to be used in the present invention, a copolymer in which a main monomer such as 2-ethylhexyl acrylate, isononyl acrylate, etc., is copolymerized with a carboxyl group-containing monomer such as acrylic acid, methacrylic acid, etc., can be used.

A thickness of the adhesive layer is not particularly limited, and can be optionally set and generally preferably 20 µm or more, more preferably 30 µm or more, and particularly preferably 40 µm or more. Provided that the upper limit value is generally preferably 100 µm or so.

In the present invention, the adhesive layer can be formed, for example, by applying a method in which a solvent-based or an emulsion-based adhesive agent is directly coated onto the substrate layer, and dried, a method in which these adhesive agents are coated onto a peeling paper to previously form an adhesive layer, and the adhesive layer is adhered to the substrate layer, etc. It may be also applied a method in which a radiation curing type adhesive agent is coated onto the substrate layer, and the radiation is irradiated to both of the adhesive layer and the film to simultaneously cure the substrate layer and the adhesive layer to form a material.

The adhesive sheet of the present invention is preferably a material which is inconspicuous when it is adhered to the adherend depending on the uses. That is, it is preferred to be an adhesive sheet which can show an appearance as if the adhesive sheet is not adhered even when the adhesive sheet is adhered to the adherend. For example, such appearance characteristics can be shown by a gloss value. In the case of such a use, the gloss value of the substrate is preferably 70 or more, more preferably 75 or more, and particularly preferably 80 or more. If the gloss value is less than 70, when the adhesive sheet is adhered to the adherend, the adhered adhesive sheet is stand out conspicuously, easily admitted with eyes, and it is easily recognized that the adhesive sheet is adhered.

Provided that the gloss value can be measured by using a Micro Gloss Meter and, for example, it can be measured as follows. That is, an adhesive sheet in which an acrylic adhesive layer with a thickness of 50 µm has been formed on one of the surfaces of a substrate is adhered to a coating film which comprises coating an acid epoxy crosslinking type acrylic-based paint onto a steel plate by using an application solution, and then, it is measured by using a Micro Gloss Meter.

The adhesive sheet of the present invention is required to be transparent so as to see the color of the coating surface of the adherend, etc., as an appearance as such, but it may be used as a coating substituted adhesive sheet by coloring with the same color as that of the coating surface, or coloring with a different color using a pigment, etc.

In the adhesive sheet of the present invention, an application sheet may be used for improving an adhering operation of the adhesive sheet, for example, for positioning of adhesion, etc.

The adhesive sheet of the present invention is excellent in surface sliding property, whereby flaws and wrinkles are difficultly generated by a squeegee, etc., at the time of adhesion, so that it is suitable as an adhesive sheet for protection at which good appearance is required. Also, since the adhesive sheet of the present invention is excellent in stain resistance, it is suitable as an adhesive sheet for protection to the portion that mud stain, etc., is terrible or the portion that it is easily polluted by finger marks, etc. Furthermore, according to the present invention, since an adhesive sheet excellent in followability to a curved surface can be realized, such an adhesive sheet can show excellent adhering workability to the adherend having a severe three-dimensionally curved surface. Accordingly, it is suitable as an adhesive sheet for protection of a large area adherend (a material to be adhered), and an adherend having a severe three-dimensionally curved surface. It is suitable for the uses of an adhesive sheet for protection which is for protecting a coating surface of a transportation machine, for example, a motorcycle, a bicycle, a railroad vehicle, a ship, a snowmobile, a gondola, a lift, an escalator, an automobile, an aircraft, etc., in particular, an automobile, an aircraft, a motorcycle, etc., a light guide film of a mobile phone, a sealing material of an electrode substrate, a film for decoration of a handrail of an escalator, a transparent film used in combination with a transparent glass, etc.

EXAMPLES

In the following, the present invention is explained in detail by referring to Examples, but the present invention is not limited by these. Incidentally, in the following Examples, part(s) means part(s) by weight and % means % by weight within the range which does not cause any problems in the common knowledge, otherwise specifically mentioned.

In addition, the measurement method and the evaluation method used in the following Examples are shown below. In evaluation of the stain resistance mentioned below, an acrylic baked white panel (available from Nippon Testpanel Co., Ltd.) used as a standard test panel was a material showing the values of an L* value of 95.68 to 98.56, an a* value of −1.26 to −1.01 and a b* value of 0.16 to 1.52.

(Measurement Method and Evaluation Method)

(1) Evaluation of Flexibility (Measurement of Load at the Time of 5% Elongation)

An acrylic-based adhesive layer with a thickness of 50 μm was formed on one of the surfaces of the substrate to prepare an adhesive tape. This adhesive tape was cut to a width of 10 mm and a length of 160 mm, and a tensile test was carried out with a tensile rate of 200 mm/min, a distance between chucks of 100 mm at 23° C. to obtain a stress-strain curve. A load at the time of 5% elongation of the adhesive sheet was obtained.

(2) Evaluation of Stress Relaxation Property (Measurement of Stress Relaxation Rate)

An acrylic-based adhesive layer with a thickness of 50 μm was formed on one of the surfaces of the substrate to prepare an adhesive sheet. This adhesive sheet was cut to a width of 10 mm and a length of 160 mm, and at a tensile rate of 200 mm/min and a distance between chucks of 100 mm at 23° C., it was continued to tension until the distance between chucks became 110 mm and stopped at 10% elongated state. A load (residual stress) after lapsing 600 seconds from the stopping was measured, and a stress relaxation rate was obtained by using the following calculation formula.

Stress relaxation rate (%)={(load at 10% elongation−load at 10% elongation after lapsing 600 seconds)/load at 10% elongation}×100

(3) Measurement of Static Friction Coefficient

The substrate was cut to a size with a width of 80 mm and a length of 100 mm, the substrate was adhered to a support, the support was adhered onto a standard test panel (JIS G3141: available from Nippon Testpanel Co., Ltd.) using a double-sided adhesive tape, etc., and a sliding piece was placed on the substrate and a static friction coefficient of the outermost surface layer (ex. a surface protective layer) was measured according to JIS K7125. Incidentally, a contact area of the sliding piece was made 63 mm×63 mm and a total mass of the sliding piece was made 200 g (1.96N), a squeegee cloth was adhered to the contacting surface of the sliding piece and the surface of the substrate, and the measurement was carried out by pulling the sliding piece under the condition with a sliding speed of 100 mm/min. The static friction coefficient was obtained by using the following mentioned calculation formula according to JIS K7125. Incidentally, an acrylic adhesive layer with a thickness of 50 μm was formed onto the substrate layer surface of the substrate, and it may be adhered to the support as an adhesive sheet.

$$\mu = Fs/Fp$$

(μ: Static friction coefficient, Fs: Static frictional force (N), Fp: Normal force caused by mass of sliding piece (=9.8 N/kg×0.2 kg))

Figure 1A:
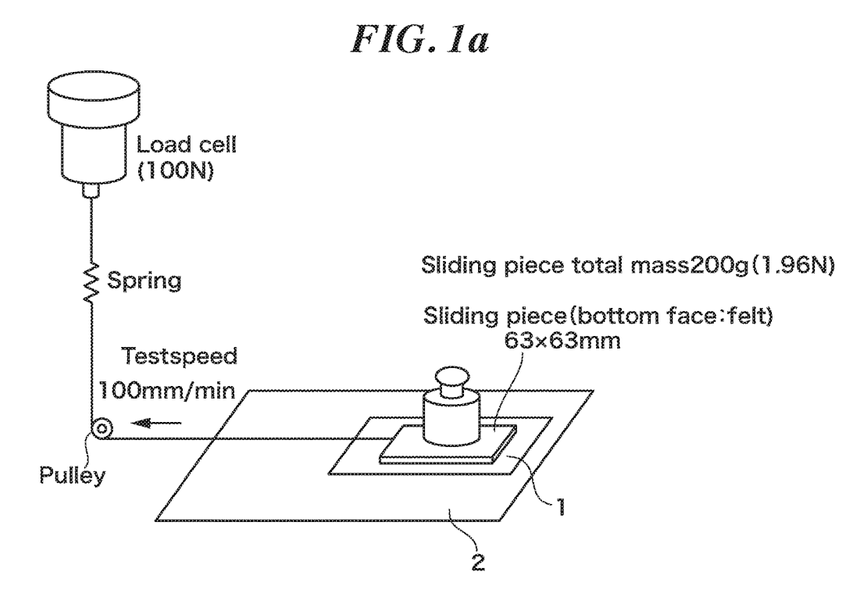
FIGS. 1a and 1b are schematic drawing drawings for explaining the method of measuring a static friction coefficient.
Figure 1B:
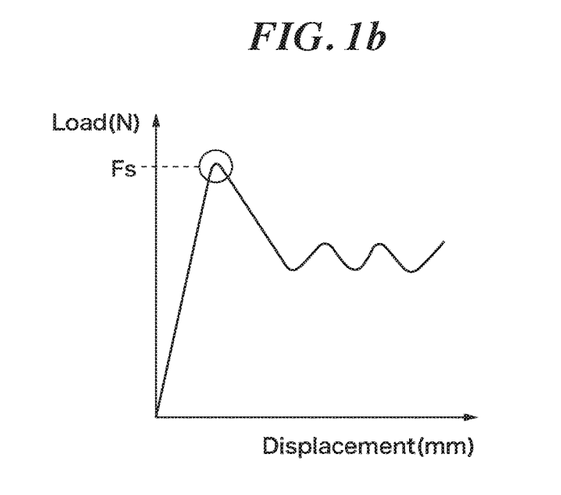

FIG. 1a and FIG. 1b are schematic views for explaining the measurement method of the static friction coefficient. As shown in FIG. 1a, the sample 1 is fixed by adhering onto a mating material 2 (ex. standard test panel) through a double-sided adhesive tape, etc., by bonding so that the measurement surface of the sample 1 (ex. the substrate, the adhesive sheet) faces upward, a sliding piece (a contact area 63 mm×63 mm) is provided onto the measurement surface of the sample 1, and the sliding piece is pulled with a test speed of 100 mm/min. A normal force is caused by the sliding piece, so that the bottom surface of the sliding piece is covered with a material having elasticity (felt, etc.) so as to apply a uniform pressure distribution. Incidentally, the sample 1 may be directly fixed to the mating material 2 but it may be fixed by attaching to an auxiliary plate such as the support, etc., as mentioned above. As shown in FIG. 1a, the sliding piece may be also connected to a load cell through a spring. As shown in FIG. 1b, a force linearly increases to provide friction, and reaches the maximum load. The peak shows a static frictional force (Fs). The static friction coefficient can be obtained from the above-mentioned calculation formula (μ=Fs/Fp).

(4) Evaluation of Stain Resistance

An acrylic-based adhesive layer with a thickness of 50 μm were formed onto the substrate layer surface of the substrate to prepare an adhesive sheet. This adhesive sheet was adhered to an acrylic baked white panel (standard test panel available from Nippon Testpanel Co., Ltd.) by using a roller, and then, an initial L* value (an average value at light receiving angles of 15°, 25°, 45°, 75° and 110°) was measured by using a multi-angle spectral colorimeter (MA68II, manufactured by X-Rite Inc.).

Thereafter, contaminated water (JIS Z-8901-84 8 kinds of dust/water/carbon black/yellow ocher were mixed with a mass ratio of 1.3/98/0.5/0.2) was coated on the adhesive sheet, then, dried at 50° C. for 10 minutes, and the procedure was carried out for 8 cycles, and the contaminated water-coated membrane was washed by a rag with a constant force while washing with water. With regard to the adhesive sheet, the L* value (an average value at light receiving angles of 15°, 25°, 45°, 75° and 110°) after the test was measured by using a multi-angle spectral colorimeter (MA68II, manufactured by X-Rite Inc.). The ΔL* value was calculated according to the following formula, and evaluation of the stain resistance was carried out by the numerical values.

ΔL*value=L*value after the test−initial L*value before the test (5) Measurement of Gloss Value (Evaluation of Appearance Characteristics)

An adhesive sheet was prepared by forming an acrylic adhesive layer with a thickness of 50 μm on the surface of the substrate layer of the substrate. The adhesive sheet was adhered to a coating membrane prepared by coating an acid epoxy crosslinked type acrylic-based paint (trade name: "KINO1210TW" available from Kansai Paint Co., Ltd.) on a steel plate using a solution mixing with a ratio of 0.4 part by weight of "FILM-ON" (trade name, available from CP Films Inc.) and 99.6 parts by weight of water as an application solution, and using a squeegee, and then, the gloss value (at the measurement angle of 20°) was measured by using a Micro-Tri-Gross meter (manufactured by BYK-Gardner).

Resin compositions (b1 to b4) for a surface protective layer (layer B) in the substrate were prepared as follows.

Preparation Example 1: Preparation of Resin Composition b1

100 parts of an acrylic-based resin with a concentration of 43% in ethyl acetate solution (trade name: "Hulls-hybrid UV-G301" available from Nippon Shokubai Co., Ltd., a (meth)acrylic-based polymer with a hydroxyl value of 45 (KOH mg/g)), 28.07 parts of an isocyanate-based crosslinking agent (trade name: "Duranate TSE-100" available from Asahi Kasei Chemicals Corporation), and 108.8 parts of ethyl acetate as a diluting solvent were added to prepare a resin composition b1 for a surface protective layer.

Preparation Example 2: Preparation of Resin Composition b2

100 parts of an acrylic-based resin with a concentration of 70% in a butyl acetate solution (trade name: "SETALUX D A 870BA" available from Nuplex Resins GmbH, a (meth)acrylic-based polymer with a hydroxyl value of 99 (KOH mg/g)), 34.00 parts of an isocyanate-based crosslinking agent (trade name: "Sumidur N3300" available from Sumika Bayer Urethane Ltd.), and 51.31 parts of a mixed solvent of ethyl acetate and xylene (ethyl acetate/xylene=1/1 wt %) as a diluting solvent were added to prepare a resin composition b2 for a surface protective layer.

Preparation Example 3: Preparation of Resin Composition b3

100 parts of a fluoroethylene/vinyl ether alternating copolymer with a concentration of 50% in a solution of xylene and toluene (trade name: "Lumiflon LF600" available from Asahi Glass Co., Ltd.), 9.51 parts of an isocyanate-based crosslinking agent (trade name: "Coronate HX" available from Nippon Polyurethane Industry Co. Ltd.), and 76.46 parts of ethyl acetate as a diluting solvent were added to prepare a resin composition b3 for a surface protective layer.

Preparation Example 4: Preparation of Resin Composition b4

74.72 parts of an aqueous-based urethane resin (a carbonate-based polyurethane emulsion, trade name: "F-2954D-5" available from DKS Co., Ltd.), 25.28 parts of an aqueous-based urethane resin (a carbonate-based polyurethane emulsion, trade name: "Superflex 460" available from DKS Co., Ltd.), 6.17 parts of an oxazoline-based crosslinking agent (trade name: "EPOCROS WS-700" available from Nippon Shokubai Co., Ltd.), 0.10 part of a polyether-based modified siloxane (trade name: "BUK-349" available from BYK Japan KK) and 1.00 part of sodium perfluoroalkenyloxybenzene sulfonate (trade name: "FTERGENT 100" available from Neos Co., Ltd. (10% diluting solvent)) as leveling agents, 1.00 part of "Rheolate 216" (available from Elementis Japan plc) as a thickening agent, 0.80 part of "UC-606" (available from ADEKA CORPORATION) as a water dispersion type photostabilizer, and 0.20 part of "UC-3140" (available from ADEKA CORPORATION) as a water dispersion type benzotriazole-based ultraviolet absorber were mixed. Then, the mixture was stirred using a disper with a rotation rate of 2,000 rpm for 10 minutes, and defoamed by using a defoaming device (2,000 rpm, 10 min) to prepare a resin composition b4 for a surface protective layer.

Example 1

A non-yellowing caprolactone ester-based thermoplastic polyurethane film (a1) having a thickness of 240 μm and a Shore hardness of 95A was used as the substrate layer (layer A). Onto the film (a1) was coated the resin composition b1 so that a thickness after curing became 10 μm, and dried and cured at a temperature of 120° C. for 2 minutes to form a surface protective layer (layer B) on the substrate layer (layer A) whereby the substrate was prepared.

With regard to the obtained substrate, measurement of the load at 5% elongation, measurement of the stress relaxation rate, measurement of the static friction coefficient, evaluation of stain proof property and measurement of the gloss value were carried out. The results were described in Table 1.

Example 2

A substrate was prepared in the same manner as in Example 1 except that, in the formation of a surface protective layer (layer B), the resin composition b2 was used in place of the resin composition b1 and dried and cured at a temperature of 120° C. for 3 minutes to form a surface protective layer (layer B).

With regard to the obtained substrate, measurement of the load at 5% elongation, measurement of the stress relaxation rate, measurement of the static friction coefficient, evaluation of stain proof property and measurement of the gloss value were carried out. The results were described in Table 1.

Example 3

A substrate was prepared in the same manner as in Example 2 except that, in the formation of a surface protective layer (layer B), the resin composition b3 was used in place of the resin composition b2 to form a surface protective layer (layer B).

With regard to the obtained substrate, measurement of the load at 5% elongation, measurement of the stress relaxation rate, measurement of the static friction coefficient, evaluation of stain proof property and measurement of the gloss value were carried out. The results were described in Table 1.

Example 4

A substrate was prepared in the same manner as in Example 1 except that, in the formation of a surface protective layer (layer B), the resin composition b4 was used in place of the resin composition b1 to form a surface protective layer (layer B).

With regard to the obtained substrate, measurement of the load at 5% elongation, measurement of the stress relaxation rate, measurement of the static friction coefficient, evaluation of stain proof property and measurement of the gloss value were carried out. The results were described in Table 1.

Example 5

A substrate having a surface protective layer on the substrate layer was prepared in the same manner as in Example 1 except for using a non-yellowing adipate ester-based thermoplastic polyurethane (a2) having a thickness of 140 μm and a Shore hardness of 85A as the substrate layer (layer A).

With regard to the obtained substrate, measurement of the load at 5% elongation, measurement of the stress relaxation rate, measurement of the static friction coefficient, evaluation of stain proof property and measurement of the gloss value were carried out. The results were described in Table 1.

Example 6

A substrate having a surface protective layer on the substrate layer was prepared in the same manner as in Example 1 except for using a non-yellowing caprolactone ester-based thermoplastic polyurethane (a3) having a thickness of 40 μm and a Shore hardness of 95A as the substrate layer (layer A).

With regard to the obtained substrate, measurement of the load at 5% elongation, measurement of the stress relaxation rate, measurement of the static friction coefficient, evaluation of stain proof property and measurement of the gloss value were carried out. The results were described in Table 1.

Example 7

A substrate having a surface protective layer on the substrate layer was prepared in the same manner as in Example 1 except for using a non-yellowing caprolactone ester-based thermoplastic polyurethane (a4) having a thickness of 90 μm and a Shore hardness of 85A as the substrate layer (layer A).

With regard to the obtained substrate, measurement of the load at 5% elongation, measurement of the stress relaxation rate, measurement of the static friction coefficient, evaluation of stain proof property and measurement of the gloss value were carried out. The results were described in Table 1.

Comparative Examples 1 to 4

Substrates were prepared without forming a surface protective layer as shown in Table 1. That is, as the substrate, the substrate layer a1, the substrate layer a2, the substrate layer a3 and the substrate layer a4 were used for the substrates of Comparative examples 1 to 4, respectively.

With regard to the obtained substrate, measurement of the load at 5% elongation, measurement of the stress relaxation rate, measurement of the static friction coefficient, evaluation of stain proof property and evaluation of measurement of the gloss value were carried out. The results were described in Table 1.

Adhesive sheets were prepared by using the substrates of Examples 1 to 7.

<<Preparation of Adhesive Layer>>

To a mixture in which 90 parts of isononyl acrylate and 10 parts of acrylic acid had been mixed as monomer components were formulated 0.05 part of "Irgacure 651" (trade name, available from Ciba Speciality Chemicals Corporation) and 0.05 part of "Irgacure 184" (trade name, available from Ciba Speciality Chemicals Corporation) as photopolymerization initiators, and ultraviolet ray was irradiated until the viscosity became about 25 Pa·s (BH viscometer No. 5 rotor, 10 rpm, measurement temperature 30° C.) to prepare an acrylic composition (UV syrup) a part of which has been polymerized.

To 100 parts of the obtained UV syrup were added 0.20 part of isononyl acrylate, 0.20 part of trimethylol propane triacrylate and 1 part of a hindered phenol type antioxidant (trade name: "Irganox 1010", available from Ciba Speciality Chemicals Corporation) to prepare an adhesive composition.

This adhesive composition was coated, as a temporary support 2, onto a peeling treatment surface of the polyethylene terephthalate film with a thickness of 50 μm so that a thickness as the final product became 50 μm.

A PET film which had been subjected to peeling treatment was overlapped thereon as a separator and covered, then, ultraviolet ray (illumination: 290 mW/cm$^2$, light quantity: 4,600 mJ/cm$^2$) was irradiated to the PET film surface using a metal halide lamp to cure the same to form an adhesive layer on a temporary support 2. Thereafter, it was dried at 140° C. for 3 minutes to dry the unreacted residual acrylic-based monomer to prepare an adhesive layer.

<<Preparation of Adhesive Sheet>>

The separator was removed, to the surface opposite to the surface of the surface protective layer side (that is, the substrate layer surface) of the obtained substrate was adhered so that the adhesive layer is overlapped to prepare an adhesive sheet (layer constitution of temporary support 1/surface protective layer/substrate layer/adhesive layer/temporary support 2).

TABLE 1

| | Substrate | | Load at 5% elongation (N/10 mm) | Stress relaxation rate (%) | Static friction coefficient | Stainproof property (ΔL* value) | Visibility Gloss value |
|---|---|---|---|---|---|---|---|
| | Layer A | Layer B | | | | | |
| Example 1 | a1 | b1 | 7.80 | 65.56 | 0.54 | 1.21 | 75.5 |
| Example 2 | a1 | b2 | 6.68 | 67.57 | 0.57 | 0.11 | 90.9 |
| Example 3 | a1 | b3 | 9.26 | 71.96 | 0.69 | 1.83 | 63.1 |
| Example 4 | a1 | b4 | 8.44 | 54.92 | 0.99 | 4.92 | 78.0 |
| Example 5 | a2 | b1 | 3.64 | 66.64 | 0.58 | 2.19 | 93.3 |
| Example 6 | a3 | b1 | 2.83 | 70.26 | 0.56 | 1.09 | 93.3 |
| Example 7 | a4 | b1 | 2.79 | 70.48 | 0.64 | 1.29 | 91.4 |
| Com. Ex. 1 | a1 | — | 4.17 | 56.03 | 1.85 | 50.38 | 70.5 |
| Com. EX. 2 | a2 | — | 1.50 | 47.80 | 1.99 | 60.07 | 71.8 |
| Com. Ex. 3 | a3 | — | 0.52 | 52.58 | 1.52 | 55.95 | 69.7 |
| Com. Ex. 4 | a4 | — | 1.07 | 49.62 | 1.67 | 54.25 | 57.9 |

As can be clearly seen from Table 1, it can be understood that the substrates of Examples 1 to 7 had loads at the time of 5% elongation of 15 N/cm or less, the stress relaxation rates of 40% or more, the static friction coefficients of 0.05 or more and 1.50 or less and the stainproof property (ΔL* values) of within the range of 0.01 to 8.00.

The respective adhesive sheets obtained by using the substrates of Examples 1 to 7 have been found that each is excellent in curved surface followability and well followed to the portion having a three-dimensionally curved surface, can be neatly adhered without repelling or floating after the adhesion, and a good surface sliding property and excellent stainproof property can be realized.

That is, according to the present invention, an adhesive sheet excellent in all of flexibility, a stress relaxation rate, a surface sliding property and a stainproof property could be realized.

UTILIZABILITY IN INDUSTRY

The adhesive sheet of the present invention can be suitably used as an adhesive sheet for protection which is required to have a surface sliding property and stainproof property. Also, the adhesive sheet of the present invention can be suitably used as an adhesive sheet which is further required to have flexibility to a curved surface, etc., in particular, it can be suitably used for an adherend (a material to be adhered) having a severe three-dimensionally curved surface. It can be used as an adhesive sheet for protecting a coating film surface exposed to a harmful environment including, for example, weather outdoors, a solvent, dust, oil and fats, and marine environment, etc., or an adhesive sheet for decoration. In addition, it is also suitable as a chipping tape for protecting a coating membrane of a body of an automobile, etc., an adhesive sheet for a body protection film or an adhesive sheet.

EXPLANATION OF REFERENCE NUMERALS

1 Sample
2 Mating material

The invention claimed is:

1. An adhesive sheet comprising a substrate and an adhesive layer,
wherein the substrate consists of a substrate layer containing an ester-based thermoplastic polyurethane and a surface protective layer containing a component selected from the group consisting of an acrylic-based resin that is a crosslinked product comprising a (meth) acrylic-based polymer having a hydroxyl value of 20 to 120 KOH mg/g and a crosslinking agent, and a fluorine-based resin,
wherein the surface protective layer is provided as the outermost surface of the adhesive sheet, and
the adhesive layer is directly on the substrate layer,
a static friction coefficient of the substrate being 0.05 or more and 1.50 or less, and an absolute value of a $\Delta L^*$ value of the substrate being 0.01 or more and 45.00 or less, wherein the $\Delta L^*$ value represents an index of stainproof property.

2. The adhesive sheet according to claim 1, wherein a load at a time of 5% elongation of the substrate is 1 N/cm or more and 15 N/cm or less.

3. The adhesive sheet according to claim 1, wherein a stress relaxation rate of the substrate by elongating to 10%, stopping the elongation at that state and after lapsing 600 seconds is 40% or more and 100% or less.

4. The adhesive sheet according to claim 1, wherein a gloss value of the substrate at a measurement angle of 20° is 70 or more.

5. The adhesive sheet according to claim 1, wherein a Shore hardness of the substrate layer is 80A or more and 65D or less.

6. The adhesive sheet according to claim 1, wherein the adhesive sheet is used as a protective sheet for protecting a surface of an adherend.

7. The adhesive sheet according to claim 2, wherein a stress relaxation rate of the substrate by elongating to 10%, stopping the elongation at that state and after lapsing 600 seconds is 40% or more and 100% or less.

8. The adhesive sheet according to claim 1, wherein the ester-based thermoplastic polyurethane contained in the substrate layer is a non-yellowing ester-based thermoplastic polyurethane.

9. The adhesive sheet according to claim 1, wherein the crosslinking agent is an isocyanate-based crosslinking agent and/or an oxazoline-based crosslinking agent.

* * * * *